United States Patent
Holcombe et al.

(10) Patent No.: US 11,627,603 B2
(45) Date of Patent: Apr. 11, 2023

(54) TECHNIQUES TO REDUCE TRANSMISSION FAILURES IN TIME-SLOTTED CHANNEL HOPPING NETWORKS

(71) Applicant: Landis+Gyr Innovations, Inc., Alpharetta, GA (US)

(72) Inventors: Michael Sean Holcombe, Roswell, GA (US); Justin Clifford Matthews, Arncliffe (AU)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 107 days.

(21) Appl. No.: 17/235,520

(22) Filed: Apr. 20, 2021

(65) Prior Publication Data

US 2022/0338250 A1  Oct. 20, 2022

(51) Int. Cl.
  H04W 74/04 (2009.01)
  H04L 5/00 (2006.01)
  H04W 72/542 (2023.01)

(52) U.S. Cl.
  CPC .......... *H04W 74/04* (2013.01); *H04L 5/0012* (2013.01); *H04W 72/542* (2023.01)

(58) Field of Classification Search
  CPC .. H04W 74/04; H04W 72/1231; H04L 5/0012
  See application file for complete search history.

(56) References Cited

U.S. PATENT DOCUMENTS

| 2005/0002364 A1* | 1/2005 | Ozer | H04W 74/0816 370/473 |
|---|---|---|---|
| 2005/0018612 A1* | 1/2005 | Fitzgerald | H04L 43/50 370/449 |
| 2005/0058151 A1* | 3/2005 | Yeh | H04W 52/46 370/445 |
| 2008/0080473 A1* | 4/2008 | Thubert | G06F 13/4045 370/348 |
| 2009/0213815 A1* | 8/2009 | Sherman | H04W 74/0841 370/336 |
| 2016/0021011 A1* | 1/2016 | Vasseur | H04L 47/25 370/235 |

(Continued)

OTHER PUBLICATIONS

International Application No. PCT/US2022/025428, International Search Report and Written Opinion dated Jun. 29, 2022, 12 pages.

*Primary Examiner* — Christopher M Crutchfield
*Assistant Examiner* — Tito Q Pham
(74) *Attorney, Agent, or Firm* — Kilpatrick Townsend & Stockton LLP

(57) ABSTRACT

A first node in a TSCH network may receive a message-initiation packet from a second node on the TSCH network. Based on information in the message-initiation packet, the first node may determine a transmission time for a message content packet that is associated with the message-initiation packet. The first node may generate or modify a node-specific transmission delay that indicates a backoff associated with the second node. The node-specific transmission delay may indicate a quantity of backoff time slots during which the first node delays initiating a transmission with the second node. If the first node receives, during the node-specific transmission delay, an additional packet intended for the second node, the first node may queue the additional packet until after the node-specific transmission delay is completed.

18 Claims, 7 Drawing Sheets

(56) References Cited

U.S. PATENT DOCUMENTS

| | | | |
|---|---|---|---|
| 2016/0021596 A1* | 1/2016 | Hui | H04L 47/2408 |
| | | | 370/329 |
| 2018/0146489 A1* | 5/2018 | Jin | H04B 7/022 |
| 2018/0242362 A1* | 8/2018 | Kim | H04W 24/10 |
| 2021/0219286 A1* | 7/2021 | Veillette | H04W 74/0808 |
| 2022/0132572 A1* | 4/2022 | Fang | H04W 74/0808 |

* cited by examiner

TECHNIQUES TO REDUCE TRANSMISSION FAILURES IN TIME-SLOTTED CHANNEL HOPPING NETWORKS

TECHNICAL FIELD

This disclosure relates generally to the field of message-transmission protocols in computer networks, and more specifically relates to reducing transmission failures related to message transmission.

BACKGROUND

A computer network may include one or more computing devices, or nodes, that communicate with other nodes in the computer network. In some cases, the computer network may implement a time-slotted channel hopping ("TSCH") protocol. In some cases, the computer network that implements the TSCH protocol ("TSCH network") may include multiple nodes that transmit and receive messages, such as a message including a packet. A node included in a TSCH network may transmit and receive messages with neighboring nodes in the network, such transmissions that occur within a particular time slot on a particular channel of the TSCH protocol. In some cases, the TSCH network may include one or more devices operating on a limited power supply (such as a battery), one or more devices operating on a stable power supply (such as an electrical connection to grid power), or devices using a combination of limited or stable power supplies.

In some cases, a first node may initiate a transmission to a second node in the TSCH network. However, if the second node is already involved in a transmission with an additional node, the transmission from the first node may fail. For example, the second node might not respond to the first node's transmission, or the first node's transmission might be dropped. In some cases, failed transmissions can cause inefficient operation of nodes in the TSCH network. For example, the first node might inefficiently use time slots to attempt transmission to the second node while the second node is already involved in a transmission. In addition, the first node might wait a period of time before attempting to transmit again to the second node, resulting in further inefficiencies related to the waiting period. In some cases, a node that is operating on battery power may expend energy to attempt a transmission, such as by applying battery power to boost function of an antenna. If the transmission fails, the battery-operated node may have inefficiently used battery power without completing the attempted transmission. To improve efficient operation of a TSCH network, it is desirable to reduce transmission failures among nodes in the TSCH network.

SUMMARY

According to certain implementations, a computer network node in a TSCH network may be configured for receiving a message-initiation packet from an additional node in the TSCH network. Based on the message-initiation packet, the computer network node may determine a quantity of backoff timeslots during which the additional node transmits a message content packet. The message content packet may be associated with the message-initiation packet. The computer network node may modify a node-specific transmission delay associated with the additional node. The node-specific transmission delay may indicate that the additional node is unavailable to receive transmissions during the quantity of backoff time slots. The computer network node may receive an additional message content packet having a destination for the additional node. Based on the node-specific transmission delay, the computer network node may queue the additional message packet for transmission subsequent to the quantity of backoff time slots.

In some implementations, a first node may receive a message-initiation packet from a second node. Based on the message-initiation packet, the first node may determine a transmission time of a message content packet associated with the message-initiation packet. The first node may modify a node-specific transmission delay associated with the second node. The node-specific transmission delay may indicate that a quantity of backoff time slots during which the first node delays initiating a transmission to the second node. The first node may determine an additional message content packet having a destination for the second node. Based on the node-specific transmission delay, the first node may queue the additional message packet for transmission to the second node subsequent to the node-specific transmission delay.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Figure 1A:
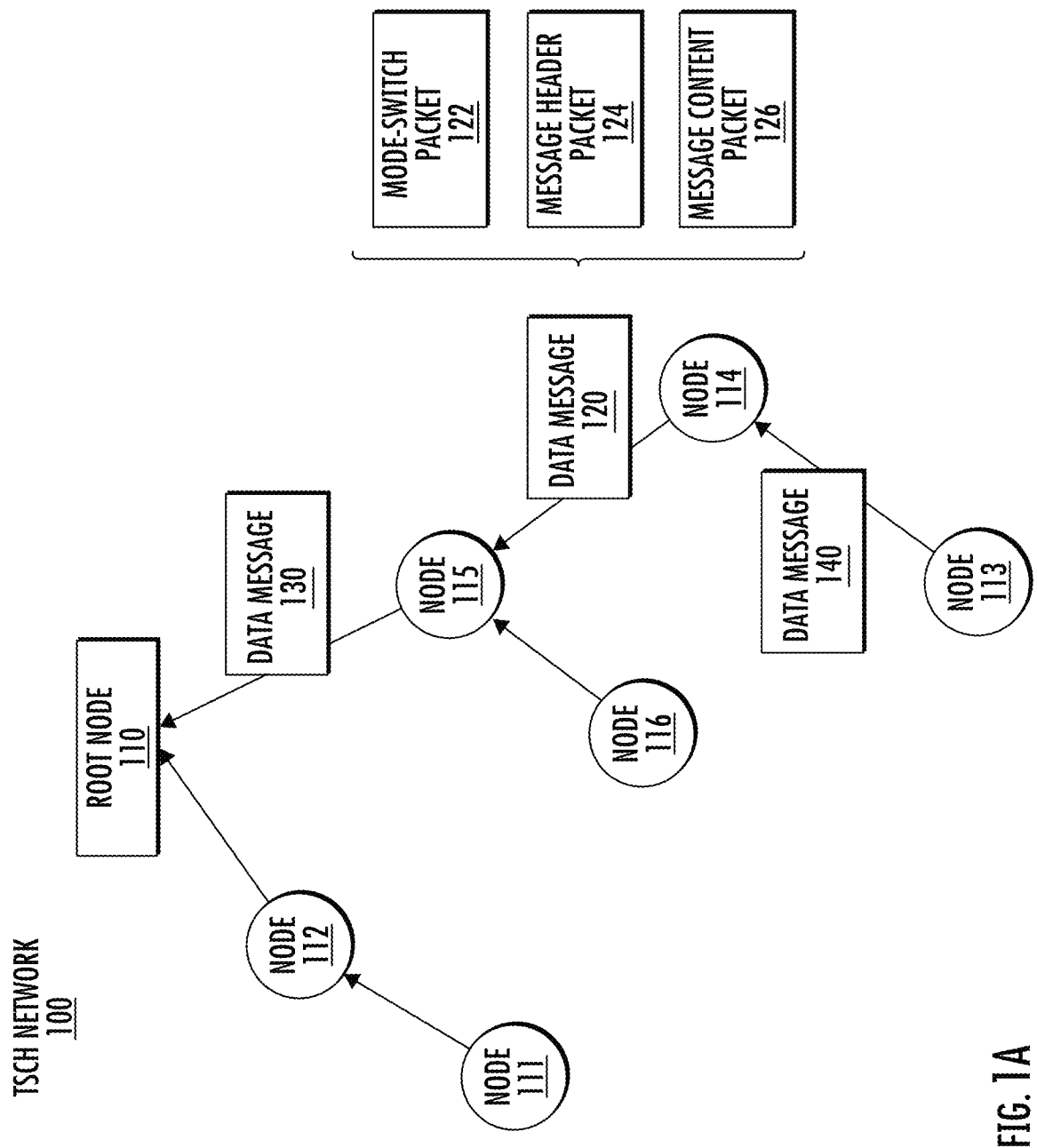
FIGS. 1a and 1b (collectively referred to herein as FIG. 1) are diagrams depicting an example of a TSCH network that includes multiple nodes having routing relationships or transmission ranges, according to certain implementations.

As discussed above, efficient transmission of messages within a TSCH network may be improved by reducing transmission failures among nodes in the TSCH network. Certain implementations described herein provide techniques to reduce transmission failures that are related to recipient nodes that are not ready to receive messages, such as a recipient node that is already engaged in an additional transmission to another node. For example, an originating node may initiate a transmission of a message to another node within a TSCH network. A portion of the message may be broadcast to multiple nodes in the TSCH network, such as a message header packet ("header," "header packet") that is broadcast to multiple nodes within communication range of the originating node. Nodes that receive the header packet, including nodes that are not a recipient for content of the message, may determine that the originating node will be involved in a transmission, based on information included in the header. For instance, a non-recipient node (e.g., a node that is not a recipient for the message content) may determine that the originating node is involved in a transmission for a particular number of time slots based on a size of the message and a communication mode indicated by the header. In addition, the non-recipient node may determine a node-specific transmission delay associated with the originating node. During the node-specific transmission delay, the non-recipient node may avoid attempting additional transmissions with the originating node. For example, a message that is intended for the originating node may be queued for later transmission, e.g., after the node-specific transmission delay is completed. In some cases, determining a node-specific transmission delay for a particular node may reduce a number of transmission attempts to the particular node while it is already involved in a transmission, thus reducing transmission failures with the particular node. In addition, avoiding transmission attempts with the particular node during the node-specific transmission delay may improve usage of network resources on the TSCH network, such as by freeing communication channels to be used by additional nodes in additional transmissions and reducing power consumption related to failed transmission attempts.

In some implementations, a first node on a TSCH network may receive from a second node on the TSCH network a message-initiation packet, such as a header packet or a mode-switch packet. For example, the second node might broadcast the message-initiation packet on the TSCH network to all nodes within communication range of the second node. Based on information in the message-initiation packet, the first node may determine a transmission time for a message content packet that is associated with the message-initiation packet. For example, the message-initiation packet may indicate one or more of a size of the message content packet, a communication mode for the message content packet, or any other suitable information describing transmission of the message content packet. The transmission time may indicate a quantity of time slots or a communication channel reserved for transmission of the message content packet. The first node may generate or modify a node-specific transmission delay that indicates a backoff associated with the second node. For example, the node-specific transmission delay may indicate a quantity of backoff time slots during which the first node delays initiating a transmission with the second node. In some cases, the first node may receive a message content packet that is intended for the second node. If the message content packet is received during the node-specific transmission delay, the first node may queue the message content packet, or otherwise delay transmission of the message content packet until after the node-specific transmission delay is completed.

As used herein, the term "TSCH network" may refer to a computer network that implements a time-slotted channel hopping ("TSCH") protocol. A TSCH network may, but need not, be a low-power or lossy computer network. In some cases, a TSCH network may include one or more nodes that typically operate with constraints on one or more of processing power, memory, or energy, such as computing devices that operate on battery power. In addition, a TSCH network may include one or more nodes characterized by one or more of high loss rates of data messages (e.g., lost packets), low data rates, or instability of communication paths between nodes on the computer network.

In some cases, a TSCH network may include one or more nodes that are organized according to a routing protocol, such as a protocol to identify communication paths between (or among) nodes on the TSCH network. Data messages may be transmitted between or among nodes via the identified communication paths. In some cases, the routing protocol identifies a root node (e.g., a root of the communication paths). For convenience, and not by way of limitation, routing relationships between (or among) nodes may be referred to as parent-child relationships. For example, a TSCH network may include a first node that is configured to transmit messages via a second node, such as messages directed to the root node. In this example implementation, the first node may be referred to as having a child status with respect to a second node, and the second node may be referred to as having a parent status with respect to the first node. In some cases, a node in a TSCH network may have a parent status with respect to a particular node and a child status with respect to an additional node. In the example implementation above, the second node may have a child status with respect to an additional node in the TSCH network, such as the root node. In some cases, a TSCH network may implement a routing protocol according to one or more standards, such as a standard RFC 6550 for "RPL: IPv6 Routing Protocol for Low-Power and Lossy Networks."

As used herein, the term "node" may refer to a computing device that is configured to receive or transmit messages in a computer network. A node may include, without limitation, a router, a gateway, an endpoint, a collector, or any other suitable type of computing device. In some cases, a node may be a virtual node, such as a node that is implemented as a software-based computing device (e.g., a cloud computing network, a virtual server).

As used herein, the terms "message" or "data message" may refer to a group of one or more data packets that is configured to be transmitted between or among nodes, such as nodes in a TSCH network. A data message may include information, such as information about a node that transmits the packet (e.g., performance information for the transmitting node), information from an additional node on the TSCH network, information from an additional computing system (e.g., a computing system external to the TSCH network), or any other suitable information. A data message may include multiple portions, such as one or more of a message-initiation packet or a message content packet. In addition, the message-initiation packet includes one or more of a mode-switch packet or a header packet. In some cases, an example node on a TSCH network may transmit the message-initiation packet (or a portion of the message-initiation packet) to multiple additional nodes on the TSCH network, such as a broadcast transmission of the mode-switch packet to any node within communication range. In addition, the example node may transmit the message content packet to a particular additional node, e.g., a parent or child of the example node, that is configured to utilize data included in the message content packet. For example, the particular additional node may be configured to modify its own behavior based on the data in the message content packet, or transmit the data to an additional parent or child, or other suitable use (or combination of uses) of the data.

As used herein, the term "communication path" may refer to a link between nodes such that the nodes are capable of transmitting and receiving messages via the communication path. A communication path may be established via any suitable communication technique between nodes, such as a wired technique (e.g., network cable) or a wireless technique (e.g., Wi-Fi, Bluetooth, cellular modem), or a combination of wired and wireless techniques.

Figure 1B:
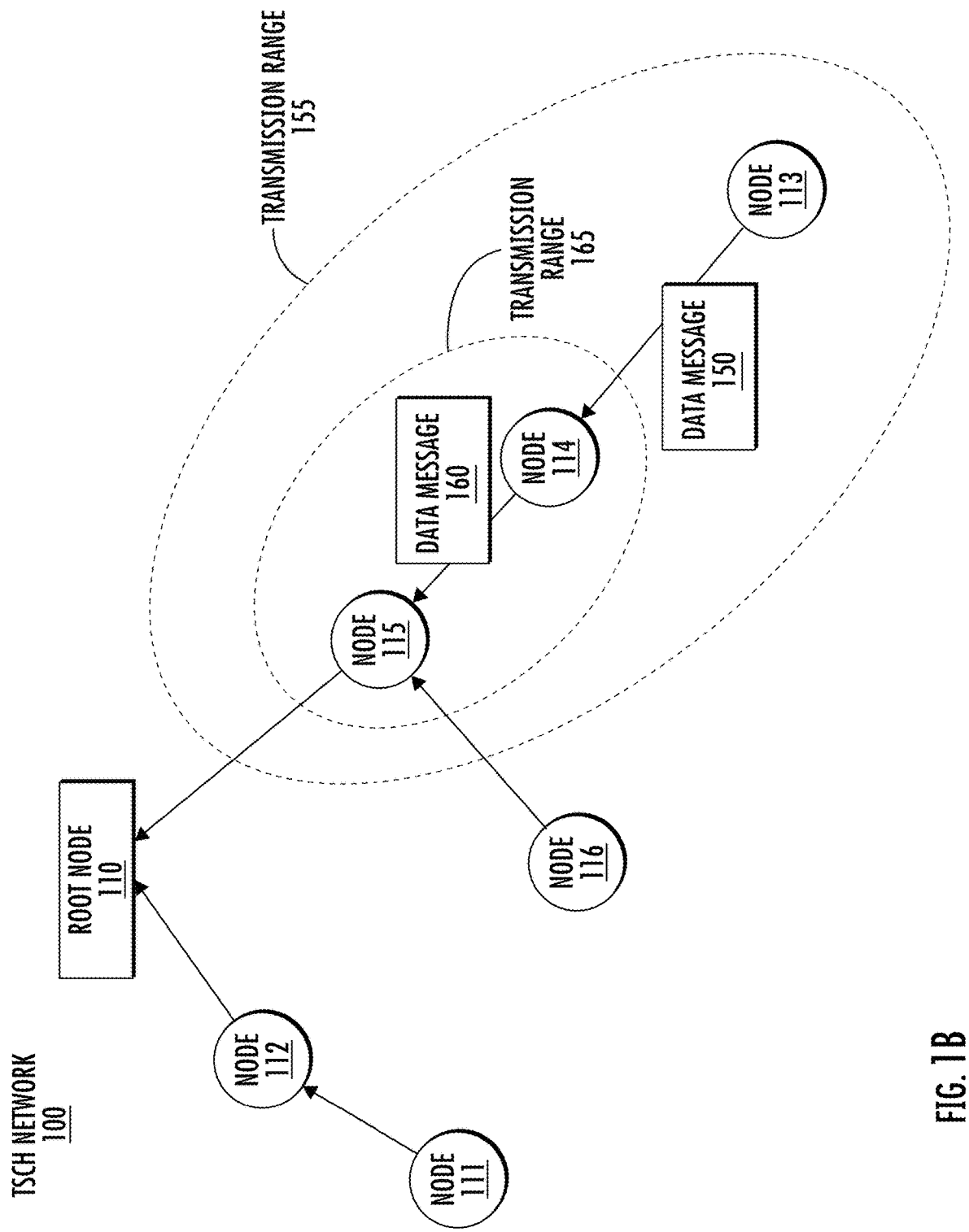

Referring now to the drawings, FIGS. 1a and 1b (collectively referred to herein as FIG. 1) is a diagram of an example TSCH network 100 that includes multiple nodes. The nodes in the TSCH network 100 may include a root node 110 and one or more additional nodes, such as nodes 111, 112, 113, 114, 115, and 116. In some cases, each of the nodes 110 through 116 may be configured to transmit and receive messages. In addition, the root node 110 may be configured to communicate with one or more additional computer networks, such as an additional TSCH network or a non-TSCH network. In addition, each of the nodes 110 through 116 may have a communication path with one or more additional nodes in the TSCH network 100. For example, the nodes 110 through 116 may be capable of communicating (e.g., transmitting and/or receiving messages) via wireless communication techniques. For instance, the nodes 111 and 112 may be capable of commuting with each other.

In some implementations, the TSCH network 100 is organized based on a routing protocol. Based on the routing protocol, for example, each of the nodes 110 through 116 may establish one or more routing relationships with one or more additional nodes. In some cases, routing relationships between or among the nodes may indicate, for each node, a parent status or a child status with respect to one or more additional nodes in the TSCH network 100. Based on the routing relationships, the TSCH network 100 may have a single root node (such as the root node 110), each non-root node has a single parent node, and each non-root node may or may not have one or more child nodes.

FIG. 1 illustrates an example set of routing relationships that may be established within the TSCH network 100. For illustrative purposes, the example parent-child relationships are illustrated via a solid line between parent and child nodes, wherein an arrow points from the child to the parent. In the TSCH network 100, a message may be transmitted from a parent node to a child node or from a child node to a parent node. The root node 110 may establish one or more child relationships with one or more additional nodes within the TSCH network 100. For example, the root node 110 may establish relationships with nodes 112 and 115, wherein the relationships indicate a parent status of the node 110 and a child status of the nodes 112 and 115. In addition, the root node 110 may establish additional relationships with additional nodes external to the TSCH network 100 (e.g., relationships with additional nodes in an additional computer networks). In some cases, each of the non-root nodes 111 through 116 may establish a parent relationship with one additional node. Furthermore, the non-root nodes 111 through 116 may establish one or more child relationships with one or more of the additional nodes. For example, the node 112 may establish a relationship with respect to the node 111, the relationship indicating a parent status of the node 112 and a child status of node 111. In addition, the node 115 may establish relationships with respect to nodes 116 and 114. The relationship between nodes 115 and 116 may indicate a child status of node 116 and a parent status of node 115. The relationship between nodes 115 and 114 may indicate a child status of node 114 and a parent status of node 115. Table 1 summarizes the example parent-child relationships illustrated in FIG. 1.

TABLE 1

| Node | Parent of node | Child(ren) of node |
| --- | --- | --- |
| Root Node 110 | (none) | 112, 115 |
| Node 111 | 112 | (none) |
| Node 112 | Root node 110 | 111 |
| Node 113 | 114 | (none) |
| Node 114 | 115 | 113 |
| Node 115 | Root node 110 | 114, 116 |
| Node 116 | 115 | (none) |

In some cases, one or more nodes in the TSCH network 100 may store information about additional nodes in the TSCH network 100, such as in a node status table (e.g., a lookup table) that indicates a status of one or more of the additional nodes. For example, each particular node may generate or modify a node status table that stores information about each additional node with which the particular node is capable of communicating. For example, the node 115 may generate a node status table that stores information about the root node 110, the node 116, and the node 114. In some cases, the node status table for a particular node may include information about additional nodes having parent or child relationships with the particular node, such as table entries indicating a parent relationship, a child relationship, a relative signal strength, or additional information related to communication with the additional nodes. In addition, the node status table for the particular node may include information about additional nodes that are capable of communicating with the particular node. For example, if the node 115 has no parent or child relationship with the node 112 but is capable of communicating with the node 112 (e.g., is within range of a signal transmitted from the node 112), the node 115 may maintain a node status table entry for the node 112. In some cases, the node status table entry associated with the node 112 may indicate an absence of a parent or child relationship or additional information related to communication with the node 112.

In the TSCH network 100, one or more messages may be transmitted between or among the nodes 110 through 116, such as data messages that are transmitted to or from a parent node or a child node. A message that is transmitted within the TSCH network 100 may include one or more of a mode-switch packet, a message header packet, or a message content packet. In the TSCH network 100, a TSCH protocol may be used for transmissions between nodes. For example, a node that participates in a transmission of a data message (e.g., a recipient node, a transmitting node) may reserve one or more communication channels or one or more time blocks for transmission of the message. The communication channels or time blocks may be reserved according to the TSCH protocol.

In some implementations, the node 114 may generate (or otherwise receive) data for a message, such as information about operations of the node 114. In addition, the node 114 may generate (or otherwise receive) a data message 120. The data message 120 may include a message content packet that describes the data from the node 114. In addition, the data message 120 may include a message-initiation packet, such as one or more of a mode-switch packet 122 or a message header packet 124. In addition, the data message 120 may include one or more message content packets, such as a message content packet 126. For convenience, and not by way of limitation, the data message 120 is described as having the message content packet 126, but other implementations are possible. For example, a particular data message on the TSCH network 100 may include multiple message content packets that describe data (e.g., having a size larger than a single message content packet).

The node 114 may transmit the message-initiation packet of the data message 120 to multiple nodes on the TSCH network 100. For example, the message-initiation packet of the data message 120 may be transmitted to each node that is within a communication range of the node 114, such as via a broadcast to at least the nodes 115 and 113 having parent or child relationships with the node 114. Based on the message-initiation packet, one or more of the nodes 113 or 115 may determine one or more of an originating node or a recipient node for the data message 120. For example, the header packet 124 may include header information that identifies the node 115 as the intended recipient node or additional header information that identifies the node 114 as the originating node. In some cases, one or more of the nodes 114 or 115 may enter a transmission state, such as by reserving a channel and one or more time blocks for communication of the data message 120.

Based on information in the message-initiation packet, the node 113 may determine that one or more of the originating or recipient nodes, i.e., nodes 114 or 115, are involved in a transmission. For example, the node 113 may determine that, for the message content packet 126 associated with the message-initiation packet, the node 114 is an originating node and the node 115 is a recipient node. In addition, the node 113 may determine a transmission time for the data message 120, such as a quantity of time slots. In some cases, the transmission time may indicate a duration of the transmission between the originating node and the recipient node. For example, the transmission time for the data message 120 may include a quantity of time slots during which data of the data message 120, e.g., the message content packet 126, is transmitted on a communication channel in the TSCH network 100. The transmission time may be determined based on information from the message header packet 124, such as header data describing a size of the message content packet 126, a baud rate of the communication channel on which the data message 120 is transmitted, a length of a time slot, or other suitable information about transmission of the data message 120. For example, the node 113 may calculate the transmission time by multiplying (or otherwise combining) the size of the message content packet 126 with the baud rate of the communication channel on which the data message 120 is transmitted.

In some implementations, the node 113 may modify one or more node-specific transmission delays based on the transmission time for the data message 120. For example, the node 113 may modify a node-specific transmission delay associated with the node 114. The node-specific transmission delay may indicate a backoff for the node 114. For example, the node 113 may modify the node-specific transmission delay to indicate a quantity of backoff time slots for the node 114. During the quantity of backoff time slots, the node 113 delays (or otherwise avoids) initiating a transmission with the node 114.

As a non-limiting example, if the message-initiation packet indicates that five time slots are required for transmission of the data message 120, the node 113 may modify the node-specific transmission delay to indicate five backoff time slots for the node 114. If the node 113 receives an additional data message for the node 114 during the node-specific transmission delay, the node 113 may delay transmission of the additional data message. For example, if the node 113 generates (or otherwise receives) a data message 140 for transmission to the node 114, the node 113 may queue (or otherwise delay) the data message 140 until after the five backoff time slots are completed.

In some cases, a node-specific transmission delay may be stored in a node status table. For example, the node 113 may maintain a node status table having an entry associated with the node 114. The node 113 may modify the table entry to indicate a communication status of the node 114 (e.g., "available for transmission" status, "unavailable for transmission" status). In addition, the node 113 may modify the table entry to indicate the node-specific transmission delay associated with the node 114. In some cases, the node 113 may modify an additional node-specific transmission delay associated with the node 115, such as if node 113 is capable of communicating with the node 115 but does not have a parent or child relationship with the node 115.

In some implementations, a node may determine a node-specific transmission delay based on an estimated transmission time. The estimated transmission time may be calculated from information indicated by a message-initiation packet combined with information determined by the node. In some cases, the estimated transmission time may be calculated based on information associated with a communication mode. In addition, the estimated transmission time may be calculated based on information associated with a prior transmission to or from the node.

FIG. 1b is a diagram of example transmission ranges in the TSCH network 100 that may be associated with particular communication modes. For example one or more of the nodes 113, or 114, or 115 may be included within a transmission range 155. The transmission range 155 may be associated with a first communication mode, such that nodes included within the transmission range 155 are capable of communicating via the first communication mode. In the TSCH network 100, the first communication mode may be characterized by long-distance transmissions at a relatively low transmission rate (e.g., low baud rate, low bandwidth). In addition, one or more of the nodes 114 or 115 may be included within a transmission range 165. The transmission range 165 may be associated with the second communication mode, such that nodes included within the transmission range 165 are capable of communicating via the second communication mode. In the TSCH network 100, the second communication mode may be characterized by short-distance transmissions at a relatively high transmission rate (e.g., high baud rate, high-bandwidth). In some cases, the transmission ranges 155 and 165 may be affected by characteristics of nodes in the TSCH network 100, such as a reception sensitivity of a node antenna, an orientation of a node antenna, a transmission output power of a node, available battery power of a node, or additional characteristics of one or more nodes. In addition, the transmission ranges 155 and 165 may be affected by characteristics of the TSCH network 100, such as a base baud rate of the TSCH network 100, a geographical distance between nodes, physical features (e.g., a building) located between nodes, or additional characteristics of the TSCH network 100.

In the TSCH network 100, one or more of the nodes 110 through 116 may estimate a transmission time for a transmission between additional nodes. For example, the node 113 may complete a transmission to the node 114, such as transmission of a data message 150. In some cases, the data message 150 may include data that is intended for the node 115 (or a parent of the node 115). Subsequent to completing the prior transmission of the data message 150 to the node 114, the node 113 may receive a message-initiation packet from the node 114. The message-initiation packet may be associated with a data message 160 that is for transmission from the node 114 to the node 115. In some cases, the message-initiation packet received by the node 113 may include a mode-switch packet, such as a mode-switch packet indicating the second communication mode for transmission of the data message 160. In addition, the message-initiation packet received by the node 113 may omit a message header packet. For example, the node 114 may transmit the mode-switch packet associated with the data message 160 via the first communication mode associated with the transmission range 155. In addition, the node 114 may transmit additional packets associated with the data message 160, such as a header or a message content packet, via the second communication mode associated with the transmission range 165.

Responsive to receiving the mode-switch packet associated with the data message 160, e.g., via the first communication mode, the node 113 may estimate a transmission time for the data message 160. In some cases, the estimated transmission time may be calculated based on a combination of information included in the mode-switch packet from the node 114 and information stored in (or otherwise available to) the node 113. For instance, the node 113 may determine that the mode-switch packet is associated (or probably associated) with the data message 150, which included the data intended for the node 115. In addition, the node 113 may determine that the second communication mode indicated by the mode-switch packet has one or more particular transmission characteristics, such as baud rate, bandwidth, or other transmission characteristics. Based on a combination of information from the mode-switch packet with the information available to the node 113, the node 113 may determine an estimated transmission time for the data message 160. For example, the node 113 may calculate the estimated transmission time based on the size of the data intended for the node 115 multiplied by (or otherwise combined with) a baud rate of the second communication mode. In some cases, the node 113 may modify a node-specific transmission delay associated with the node 114. For example, the node 113 may modify the node-specific transmission delay to indicate a quantity of backoff time slots calculated from the estimated transmission time. In some cases, one or more nodes within the TSCH network 100 may reduce or avoid failed transmission attempts with additional nodes, such as by calculating node-specific transmission delays for the additional nodes. In addition, a particular node may determine a node-specific transmission delay based on information received in a message-initiation packet, information available to the particular node, or a combination of such information.

Figure 2:
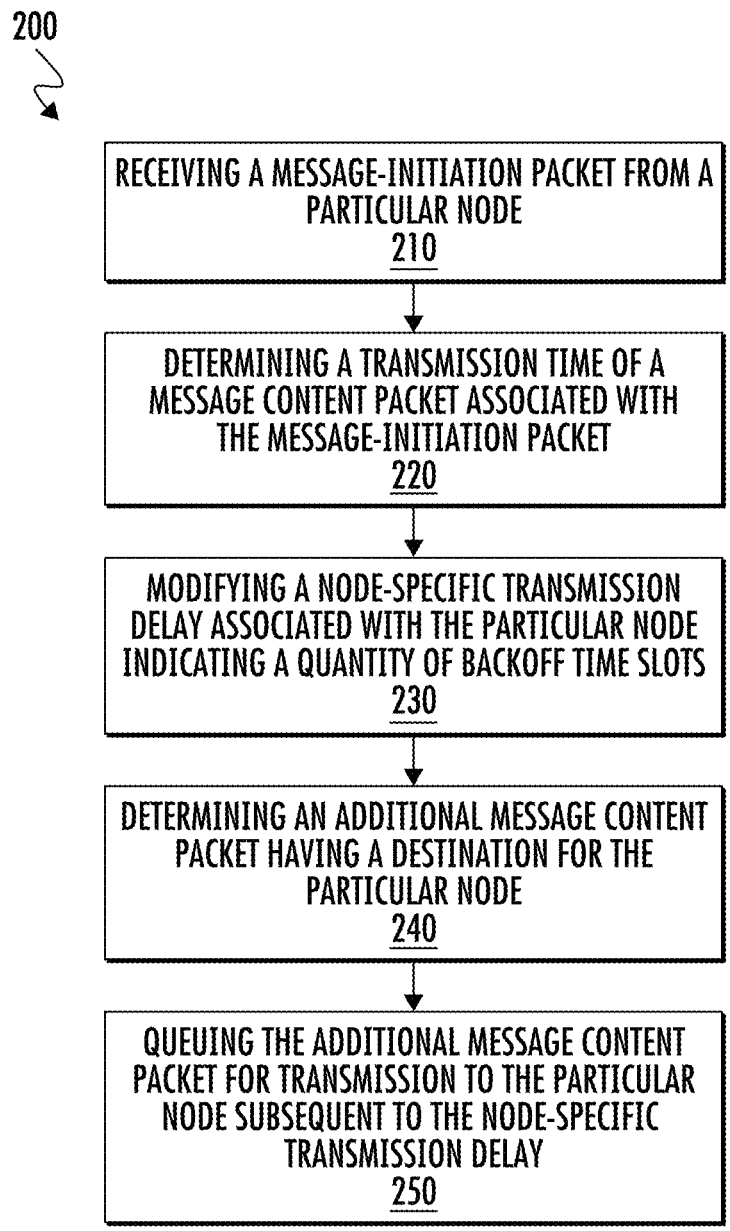
FIG. 2 is a flowchart depicting an example of a process for reducing transmission failures among nodes in a TSCH network, according to certain implementations.

FIG. 2 is a flowchart depicting an example of a process 200 for reducing transmission failures among nodes in a TSCH network. In some implementations, such as described in regards to FIG. 1, a computing device configured as a node in a TSCH network may implement operations described in FIG. 2, by executing suitable program code. For illustrative purposes, the process 200 is described with reference to the examples depicted in FIG. 1. Other implementations, however, are possible.

At block 210, the process 200 may involve receiving a message-initiation packet from a particular node in a TSCH network. The message-initiation packet may be received by an additional node in the TSCH network, such as a message-initiation packet received by a first node from a second node. In some cases, the message-initiation packet includes one or more of a mode-switch packet or a message header packet. For example, the node 113 may receive a message-initiation packet from the node 114, such as one or more of the mode-switch packet 122 or the message-header packet 124.

At block 220, the process 200 may involve determining a transmission time of one or more message content packets associated with the message-initiation packet. The transmission time may indicate, for instance, a duration of the one or more message content packets. For example, the transmission time may indicate a quantity of time slots reserved (e.g., according to a TSCH protocol) for transmission of the message content packets. The node 113 may determine, for instance, a transmission time associated with the message content packet 126.

In some cases, the transmission time may be determined based on information included in the message-initiation packet. For example, the node 113 may determine the transmission time of the message content packet 126 based on information included in the message header packet 124, such as information describing one or more of a size of the message content packet 126 or a bandwidth of the communication channel on which the data message 120 is transmitted. In addition, the transmission time may be determined based on a combination of information in the message-initiation packet and information determined by the node that received the message-initiation packet. For example, the node 113 may determine an estimated transmission time of a message content packet in the data message 160 based on information in a mode-switch packet (e.g., a communication mode selected for transmission of the data message 160) combined with information available to the node 113 (e.g., a size of message content packets transmitted in the prior data message 150).

At block 230, the process 200 may involve modifying a node-specific transmission delay associated with the particular node (e.g., from which the message-initiation packet is received). In some cases, the node-specific transmission delay may indicate a quantity of backoff time slots associated with the particular node. In addition, the node-specific transmission delay may indicate delaying, during the quantity of backoff time slots, initiation of a transmission to the particular node. For example, the node 113 may modify the node-specific transmission delay for the node 114. The node-specific transmission delay may indicate a quantity of backoff time slots for the node 114. In addition, the node-specific transmission delay may indicate a backoff (e.g., a quantity of backoff time slots) that is determined based on the transmission time determined or estimated for the node 114. In some cases, the node-specific transmission delay indicates a backoff associated with a particular transmission to or from the particular node. For example, the node 113 may calculate a first quantity of backoff time slots associated with the transmission by the node 114 of the data message 120 based on the transmission time of the message content packet 126. In addition, the node 113 may calculate a second quantity of backoff time slots associated with the transmission by the node 114 of the data message 160 based on the estimated transmission time of the data message 160.

At block 240, the process 200 may involve determining an additional message content packet having a destination for the particular node. For example, a first node that calculates a node-specific transmission delay associated with a second node may generate (or otherwise receive) an additional message content packet for the second node, such as the data message 140 generated or received by the node 113. The node 113 may determine that the data message 140 has a destination for the node 114 (or a parent of the node 114).

At block 250, the process 200 may involve queuing, or otherwise delaying, the additional message content packet. In some cases, delaying the additional message content packet may be based on the node-specific transmission delay associated with the particular node. In addition, delaying the additional message content packet may include queuing the additional message content packet for transmission to the particular node subsequent to the node-specific transmission delay. For instance, the node 113 may queue the data message 140 based on the node-specific transmission delay associated with the node 114. In addition, the node 113 may queue the data message 140 for transmission subsequent to the quantity of backoff time slots indicated by the node-specific transmission delay.

In some implementations, a particular node in a TSCH network, such as a node implementing one or more operations related to the process 200, may calculate a backoff value that is associated with an additional node in the TSCH network. In some cases the backoff value may include a default backoff value, such as a default value that could be calculated using characteristics of one or more of the particular node or the additional node. In addition, the backoff value may include a modified backoff value, such as a value that is modified from the default value. In some cases, the particular node may modify a backoff value based on information about a data message, such as a data message transmitted to or from one or more of the particular node or the additional node. For example, a first node may modify a backoff value associated with a second node based on information included in a message-initiation packet received from the second node. In addition, the first node may modify the backoff value associated with the second node based on information available to the first node about a prior transmission to the second node.

In some cases, the particular node may calculate multiple backoff values respectively associated with multiple additional nodes in the TSCH network. For example, the particular node may calculate a backoff value for every additional node in the TSCH network, for each additional node with which the particular node is capable of communicating, for each additional node having a parent or child relationship with the particular node, or for any other suitable group of nodes within the TSCH network. In some cases, the particular node may generate or modify a node status table that includes the calculated backoff value or values. For example, the particular node may generate or modify multiple node status table entries that are respectively associated with the multiple additional nodes. In some cases, each node status table entry may indicate a backoff value, such as a default backoff value or a modified backoff value, that is associated with the respective additional node. In addition, each node status table entry may indicate a communication status associated with the respective additional node. In some cases, the communication status for an additional node is modified (e.g., by the particular node) to indicate an updated communication status, such as if the additional node is unavailable to receive transmissions during the node-specific transmission delay or the quantity of backoff time slots.

Figure 3:
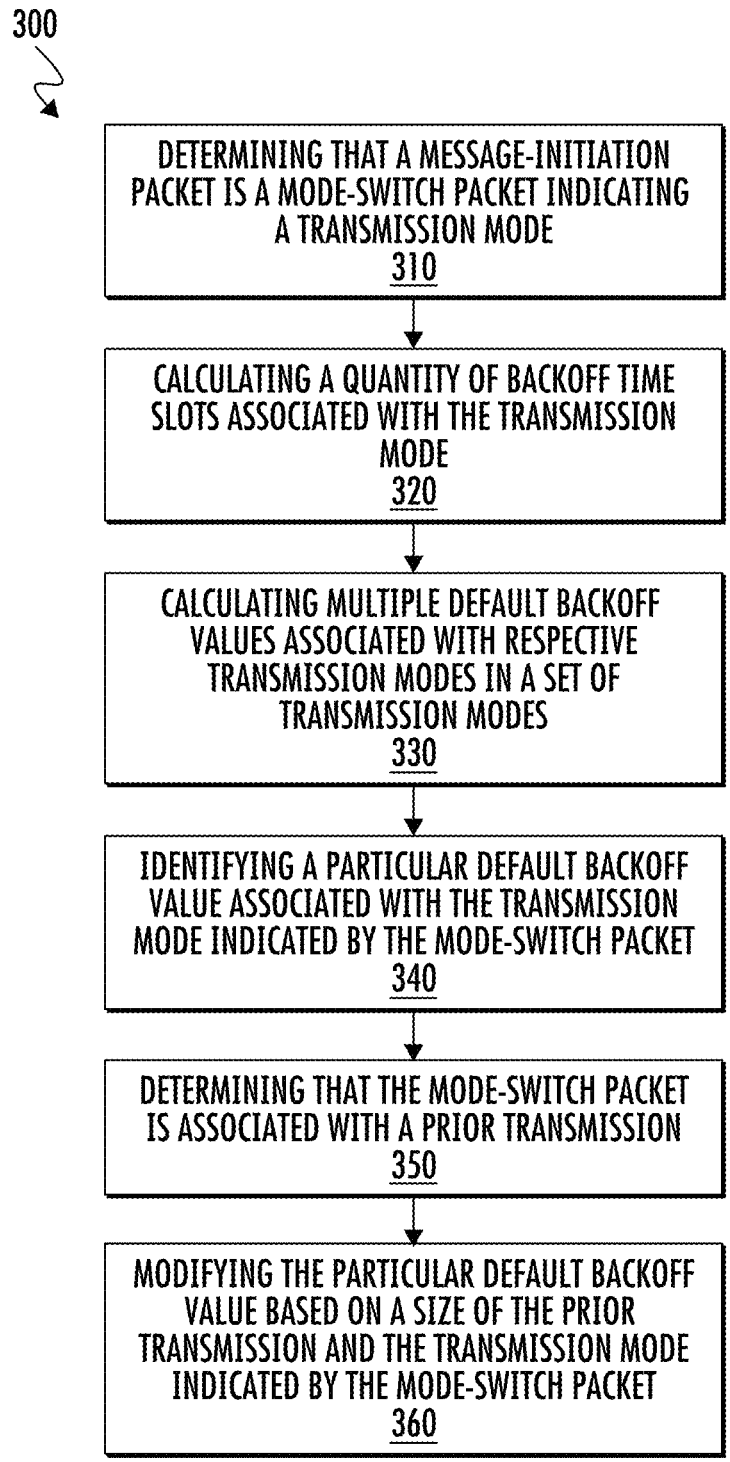
FIG. 3 is a flowchart depicting an example of a process for calculating a backoff value or for a node in a TSCH network, according to certain implementations.

FIG. 3 is a flowchart depicting an example of a process 300 for calculating one or more of a backoff value or a quantity of backoff time slots for a node in a TSCH network. In some implementations, such as described in regards to FIGS. 1-2, a computing device configured as a node in a TSCH network may implement operations described in FIG. 3, by executing suitable program code. For illustrative purposes, the process 300 is described with reference to the examples depicted in FIGS. 1-2. Other implementations, however, are possible. In some cases, one or more operations described in regards to the process 300 may be performed in combination with one or more operations described in regards to the process 200.

At block 310, the process 300 may involve determining that a message-initiation packet is a mode-switch packet. The mode-switch packet may be received by a first node in a TSCH network from a second node in the TSCH network. In some implementations, the second node may (but need not necessarily) be the particular node described in regards to the process 200. In some cases, the mode-switch packet may indicate a communication mode applied to a message content packet associated with the mode-switch packet. In addition, the communication mode may be applied to the message content packet by the second node. For example, the node 113 may receive from the node 114 a mode-switch packet associated with the data message 160. In addition, the mode-switch packet may indicate the second communication mode that is applied to a message content packet of the data message 160.

At block 320, the process 300 may involve calculating a quantity of backoff time slots associated with the communication mode. In addition, the quantity of backoff time slots may be associated with the second node. In some cases, the quantity of backoff time slots may be calculated based on information associated with one or more of the mode-switch packet, the first node, or the second node. For instance, the first node may determine a reception sensitivity of itself, such as a reception sensitivity based on an antenna strength, a noise floor, a battery status, or other characteristics of the first node. In addition, the first node may determine a transmission output power of the second node, such as a transmission output power indicated by the mode-switch packet or an additional transmission from the second node. In some cases, one or more of the reception sensitivity or the transmission output power are calculated based on a history of transmissions between the first node and the second node. For instance, the node 113 may calculate one or more of a reception sensitivity of the node 113 or a transmission output power of the node 114 based on a history of transmissions between the nodes 113 and 114.

In some cases, the node 113 may determine that it is included in the transmission range 155 or excluded from the transmission range 165 (or both) based on one or more of the calculated reception sensitivity or transmission output power. In some cases, the node 113 may calculate an additional transmission output power for itself. The additional transmission output power may be calculated based on based on an antenna strength, a noise floor, a battery status, or other characteristics of the node 113. In addition, the node 113 may provide the additional transmission output power to one or more additional nodes on the TSCH network 100, such as to the node 114 or to one or more child nodes of the node 113.

At block 330, the process 300 may involve calculating one or more default backoff values, such as respective default backoff values for one or more nodes on the TSCH network. In some cases, a default backoff value may be associated with a particular communication mode from a set of communication modes. For example, the first node may calculate one or more default backoff values associated with the second node. Each of the default backoff values may be associated with a particular communication mode for the second node, e.g., a particular communication mode from the set of communication modes. In some implementations, a backoff value may describe one or more values by which a quantity of backoff time slots may be calculated, such as a duration of time (e.g., 100 ms), a duration of a timeslot (e.g., 25 ms), a characteristic of a communication mode (e.g., 50 kbps), or other suitable values.

For example, the node 113 may calculate multiple default backoff values associated with the node 114, such as a first default backoff value associated with the first communication mode (e.g., associated with the transmission range 155) and a second default backoff value associated with the second communication mode (e.g., associated with the transmission range 165). In some implementations, the multiple default backoff values may be calculated based on a history of transmissions, such as a history of transmissions between the first node and the second node. For instance, the node 113 may calculate the first and second default backoff values based on a history of transmissions between the nodes 113 and 114.

In some cases, one or more operations relating to the block 330 may be repeated, such as repetition on a node-wise basis for a group of nodes in the TSCH network. The first node, for instance, may determine multiple default backoff values (e.g., for each communication mode in the set of communication modes) for each node in a group of additional nodes in the TSCH network. The group of additional nodes may include, for example each node in the TSCH network, each node with which the first node is capable of communicating, each node having a parent or child relationship with respect to the first node, or another suitable group of nodes in the TSCH network.

At block 340, the process 300 may involve identifying a particular default backoff value, such as from the multiple default backoff values. The particular default backoff value may be associated with the communication mode that is indicated by the mode-switch packet. In some cases, identifying the particular default backoff value may be responsive to receiving the mode-switch packet. For example, responsive to receiving the mode-switch packet associated with the data message 160, the node 113 may identify a particular default backoff value associated with the node 114. In addition, the node 113 may identify the particular default backoff value based on information included in the mode-switch packet associated with the data message 160. For instance, the node 113 may identify the second default backoff value as the particular default backoff value, responsive to determining that the mode-switch packet identifies the second communication mode applied to the data message 160.

At block 350, the process 300 may involve determining that the mode-switch packet is associated with a prior transmission, such as a prior transmission from the first node to the second node. In some cases, an association between the mode-switch packet and a prior transmission is determined based on message content of the prior transmission, such as message content indicated for a parent of the second node. For example, the node 113 may determine that the mode-switch packet associated with data message 160 is associated with the prior data message 150 transmitted from the node 113 to the node 114. In some cases, the association of the mode switch packet with the prior data message 150 may be determined responsive to determining that the prior data message 150 included message content intended for the node 115.

At block 360, the process 300 may involve modifying the particular default backoff value. In addition, the particular default backoff value may be modified based on one or more of a size of the prior transmission or the communication mode indicated by the mode-switch packet. In some cases, the first node may modify the particular default backoff value that is associated with one or more of the second node or the communication mode. The modification to the particular default backoff value may be based on a calculation of time slots required for transmission of a data message having the size of the prior transmission at a bandwidth (or other transmission characteristic) of the communication mode indicated by the mode-switch packet. For example, the node 113 may calculate a quantity of time slots during which message content from the prior data message 150 could be transmitted at the bandwidth of the second communication mode. In addition, the node 113 may modify the default backoff value associated with the node 114 (e.g. and with the second communication mode) to indicate the calculated quantity of backoff time slots.

In some implementations, a node-specific transmission delay may be generated or modified based on the modified backoff value. For example, the quantity of backoff time slots indicated by the node-specific transmission delay may be modified to include the quantity of time slots calculated for the modified backoff value.

In some implementations, a node in a TSCH network may determine a conflict-avoidance delay. The conflict-avoidance delay may be included in, or otherwise combined with, a node-specific transmission delay. In some cases, the conflict-avoidance delay may be applied by the node to further reduce transmission failures within the TSCH network. For example, a particular node in a TSCH network may generate the conflict-avoidance delay based on a random (or pseudorandom) quantity of backoff time slots. In addition, the particular node may append the conflict-avoidance delay to the node-specific transmission delay. If, for example, a parent of the node has multiple children, e.g., including the particular node, that have queued data messages that are intended for the parent, the parent node may receive multiple transmission requests upon expiration of the respective node-specific transmission delays determined by the children. To reduce transmission failures resulting from multiple transmission requests from the children, each child node e.g., including the particular node, may determine a respective conflict-avoidance delay. In addition, each child node may modify its respective node-specific transmission delay to include the respective conflict-avoidance delay. In some cases, modifying a node-specific transmission delay to include a conflict-avoidance delay may reduce transmission failures in the TSCH network.

Figure 4:
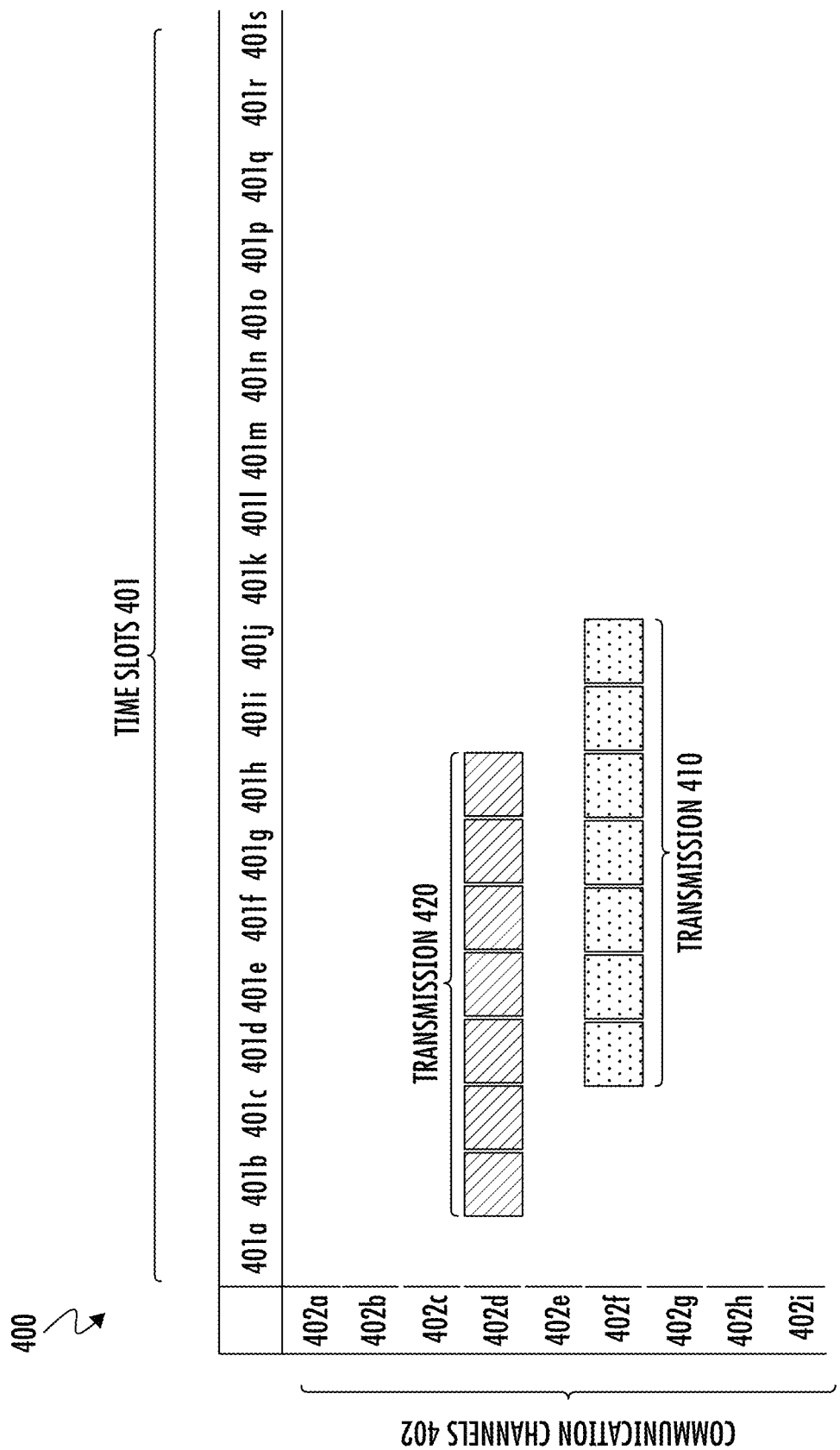
FIG. 4 is a diagram depicting an example of a transmission environment in which a signal having may be transmitted within a TSCH network, according to certain implementations.

FIG. 4 is a diagram depicting an example of a transmission environment 400 in which a signal having a communication channel and a transmission time may be transmitted. For example, the transmission environment 400 may include multiple time slots 401a-401s (collectively referred to herein as time slots 401). In addition, the transmission environment 400 may include multiple communication channels 402a-402i (collectively referred to herein as communication channels 402). Each of the channels 402 may include one or more of a center frequency or a range of frequencies. In some cases, a data message may be transmitted via one or more of the communication channels 402. In addition, the data message may be transmitted for a duration of one or more of the time slots 401. In some cases, the transmission environment 400 may be associated with a TSCH protocol. In addition, the transmission environment 400, or data messages transmitted in the transmission environment 400, may conform to local or global criteria. For example, and not by way of limitation, the transmission environment 400 and/or transmitted data messages may conform to standards set by the Federal Communications Commission (FCC), such as C.F.R. 47 § 15.

In the transmission environment 400, a transmission 420 may be transmitted on the communication channel 402d during the time slots 401b-401h. For example, a particular node on a TSCH network may transmit a data message (e.g., to a parent or child node) via the transmission 420. In some cases, the transmission 420 includes one or more of a message-initiation packet or at least one message content packets. In some cases, additional transmissions within the transmission environment 400 may utilize a larger or smaller quantity of the time slots 401.

In some implementations, an additional node on the TSCH network may attempt to initiate a transmission with the particular node during the transmission 420. For example, the additional node may attempt to initiate a transmission 410 on the communication channel 402f during the time slots 401d-401j. If the additional node is not configured to utilize one or more techniques to reduce transmission failures, such by determining a node-specific transmission delay with respect to the particular node, the transmission 410 may fail. In some cases, the attempt to initiate the transmission 410 may inefficiently utilize resources within the transmission environment 400. For example, the communication channel 402 may be reserved by the additional node for one or more of the time slots 401d-401j. In addition, reserving the communication channel 402 for the transmission 410 may prevent other nodes in the TSCH network from utilizing the communication channel 402 for additional transmissions, such as potentially successful transmissions with nodes that are not involved in the transmission 420.

Figure 5:
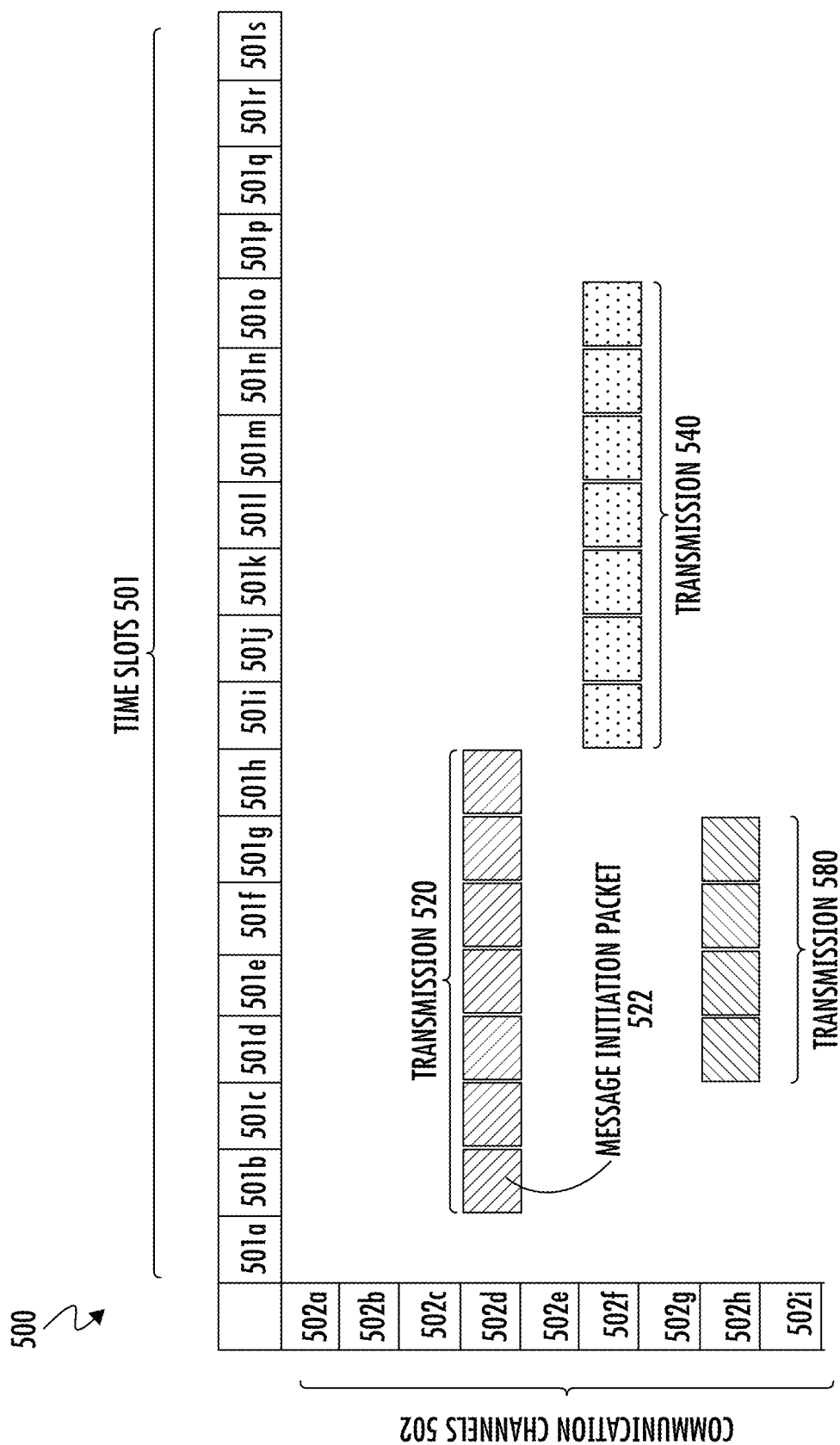
FIG. 5 is a diagram depicting an example of a transmission environment in which a node-specific transmission delay may be determined for a node in a TSCH network, according to certain implementations.

FIG. 5 is a diagram depicting an example of a transmission environment 500 that may be utilized by one or more nodes configured to determine a node-specific transmission delay associated with an additional node. In some cases, the TSCH network 100 may utilize the transmission environment 500. In the transmission environment 500, a signal having a communication channel and a transmission time may be transmitted. The transmission environment 500 may include multiple time slots 501a-501s (collectively referred to herein as time slots 501). In addition, the transmission environment 500 may include multiple communication channels 502a-502i (collectively referred to herein as communication channels 502). Each of the channels 502 may include one or more of a center frequency or a range of frequencies. In some cases, a data message may be transmitted via one or more of the communication channels 502. In addition, the data message may be transmitted for a duration of one or more of the time slots 501. In some cases, the transmission environment 500 may be associated with a TSCH protocol, a global criteria, a local criteria, or other suitable protocols or standards.

In the transmission environment 500, a transmission 520 may be transmitted on the communication channel 502d during the time slots 501b-501h. In some cases, the transmission 520 may include a transmission of the data message 120 from the node 114 to the node 115. In addition, the transmission 520 may include at least one message-initiation packet, such as a message-initiation packet 522. The message-initiation packet 522 may include one or more of the mode-switch packet 122 or the message header packet 124. In some cases, the message-initiation packet 522 at the time slots 501b may include the mode-switch packet 122. In addition, the message header packet 124 may be sent as a subsequent packet, such as a packet at the time slot 501c.

In some implementations, one or more additional nodes, such as the node 113, may receive the message-initiation packet 522. In addition, the one or more additional nodes may generate or modify respective node-specific transmission delays associated with one or more of the nodes 114 or 150. In the transmission environment 500, utilizing one or more techniques to reduce transmission failures, such as the node-specific transmission delays, may more efficiently utilize resources (e.g., as compared to the transmission environment 400). For example, the node 113 may initiate a transmission 540 that is associated with the data message 140 subsequent to completion of a node-specific transmission delay associated with the transmission 520. For example, responsive to determining that the node 114 is involved in the transmission 520, the node 113 may queue or otherwise delay the data message 140. In addition, subsequent to completion of the node-specific transmission delay associated with the node 114, the node 113 may initiate the transmission 540.

In some implementations, based on a node-specific transmission delay, a node may modify a queue position of one or more data messages. For example, during the node-specific transmission delay for the node 114, the node 113 may modify a message queue to transmit an additional data message for an additional node (e.g., other than nodes 114 or 115). If the node 113 receives the additional data message during the node-specific transmission delay, the node 113 may modify a queue position of the additional data message, such as to a queue position prior to a queue position of the data message 140. In addition, the node 113 may initiate a transmission 580 during the node-specific transmission delay, such as to transmit the additional data message to the additional node prior to transmitting the data message 140.

In some cases, resources within the transmission environment 500 may be more efficiently utilized during the node-specific transmission delay associated with the transmission 520. For example, the node 113 may initiate the transmission 580 during the node-specific transmission delay, e.g., while the node 113 is not involved in an attempted transmission the occupied node 114. As an additional example, another node in the TSCH network 100 may utilize one or more time slots prior to the transmission 540, such as potentially successful transmissions via the communication channel 502f with nodes that are not involved in the transmission 520. In some cases, operations to determine a node-specific transmission delay may not include reserving a communication channel 502 or a time slot 500 one. In addition, operations to determine a node-specific transmission delay may enable a node in the TSCH network 100 to reduce transmission failures within the transmission environment 500 without occupying resources (e.g., channels 502, time slots 501) of the transmission environment 500.

Figure 6:
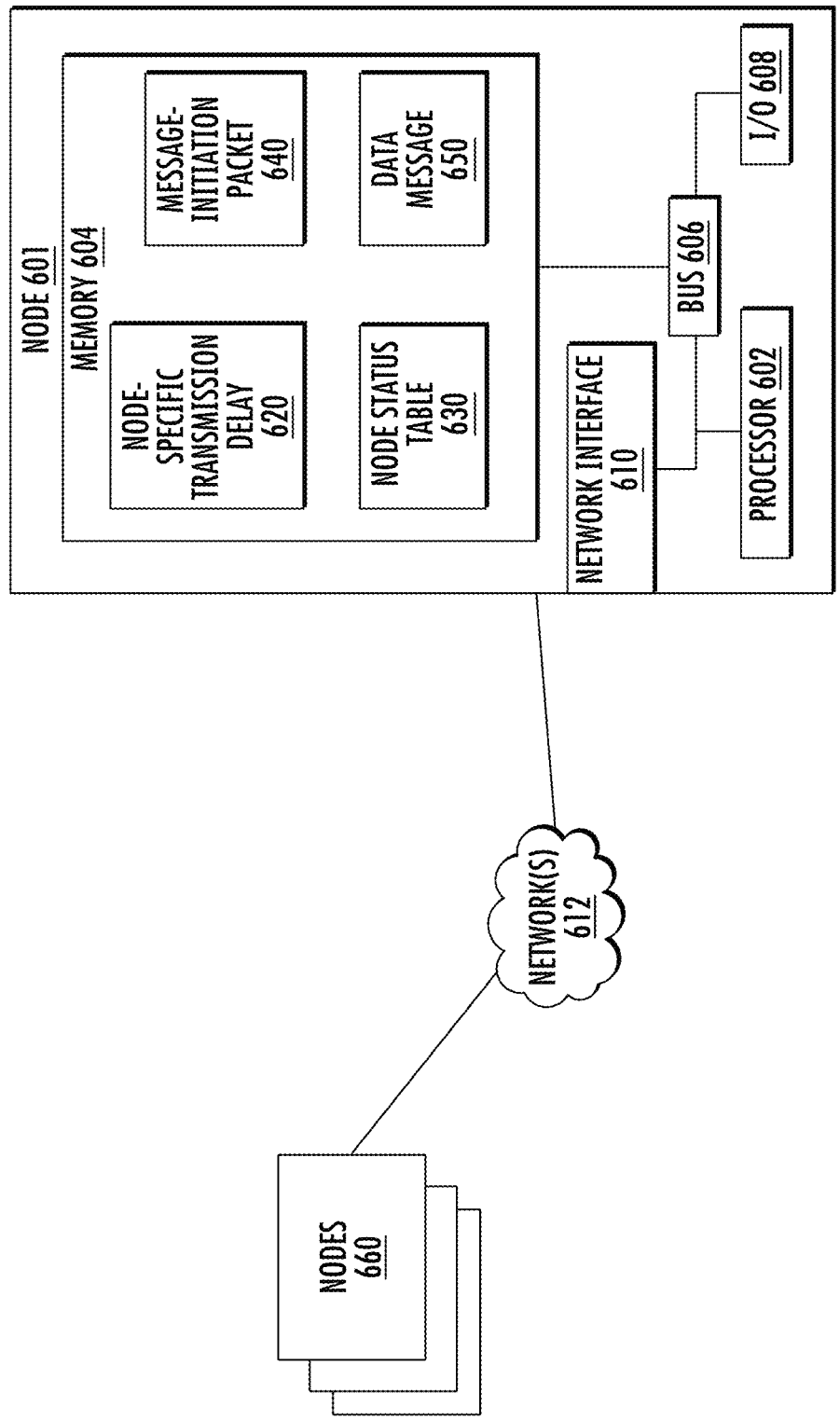
FIG. 6 is a diagram depicting an example of a computing environment capable of determining a node-specific transmission delay for a node in a TSCH network, according to certain implementations.

Any suitable computing system or group of computing systems can be used for performing the operations described herein. For example, FIG. 6 is a diagram depicting an example of a computing environment capable of determining a node-specific transmission delay for a node in a TSCH network, according to certain implementations.

The depicted example of a node 601 may include one or more processors 602 communicatively coupled to one or more memory devices 604. The processor 602 may execute computer-executable program code or accesses information stored in the memory device 604. Examples of processor 602 may include a microprocessor, an application-specific integrated circuit ("ASIC"), a field-programmable gate array ("FPGA"), or other suitable processing device. The processor 602 may include any number of processing devices, including one.

The memory device 604 may include any suitable non-transitory computer-readable medium for storing one or more of a node-specific transmission delay 620, a node status table 630, a message-initiation packet 640, a data message 650, or other received or determined values or data objects. The computer-readable medium may include any electronic, optical, magnetic, or other storage device capable of providing a processor with computer-readable instructions or other program code. Non-limiting examples of a computer-readable medium may include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The node 601 may also include a number of external or internal devices such as input or output devices. For example, the node 601 is shown with an input/output ("I/O") interface 608 that may receive input from input devices or provide output to output devices. A bus 606 may be included in the node 601. The bus 606 may communicatively couple one or more components of the node 601.

The node 601 may execute program code that configures the processor 602 to perform one or more of the operations described above with respect to FIGS. 1-5. The program code may include operations related to, for example, one or more of the node-specific transmission delay 620, the node status table 630, the message-initiation packet 640, the data message 650, or other suitable applications or memory structures that perform one or more operations described herein. The program code may be resident in the memory device 604 or any suitable computer-readable medium and may be executed by the processor 602 or any other suitable processor. In some implementations, the program code described above, the node-specific transmission delay 620, the node status table 630, the message-initiation packet 640, and the data message 650 may be stored in the memory device 604, as depicted in FIG. 6. In additional or alternative implementations, one or more of the node-specific transmission delay 620, the node status table 630, the message-initiation packet 640, the data message 650, or the program code described above may be stored in one or more memory devices accessible via a data network, such as a memory device accessible via a cloud service.

The node 601 depicted in FIG. 6 may include at least one network interface 610. The network interface 610 may include any device or group of devices suitable for establishing a wired or wireless data connection to one or more data networks 612. Non-limiting examples of the network interface 610 may include an Ethernet network adapter, a modem, and/or the like. One or more nodes, such as node 660, may be connected to the node 601 via the network 612. The network 612 may include a TSCH network, such as described herein. In some cases, the network 612 may include additional networks, such as (without limitation) the Internet, a private network (including a virtual private network), or any other suitable network. The node 601 may be able to communicate with one or more of the nodes 660 using the network interface 610.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of managing node transmissions in a computer network using a time-slotted channel hopping protocol ("TSCH network"), the method including operations executed by a processor of a first node included in the TSCH network, the operations comprising:

receiving, by the first node, a message-initiation packet from a second node;

determining, by the first node and based on the message-initiation packet, a transmission time of a message content packet associated with the message-initiation packet;

modifying, by the first node, a node-specific transmission delay associated with the second node, the node-specific transmission delay indicating a quantity of backoff time slots during which the first node delays initiating a transmission to the second node;

determining, by the first node, an additional message content packet having a destination for the second node;

queuing, by the first node and based on the node-specific transmission delay, the additional message content packet for transmission to the second node subsequent to the node-specific transmission delay;

determining that the message-initiation packet is a header packet from the second node;

determining a size of the message content packet associated with the header packet;

determining a communication mode indicated by the header packet; and calculating the quantity of backoff time slots based on the size of the message content packet and the communication mode indicated by the header packet.

2. The method of claim 1, further comprising:
determining, by the first node and based on the message-initiation packet, a recipient node for the message content packet associated with the message-initiation packet, the recipient node being a node other than the first node,
wherein modifying the node-specific transmission delay associated with the second node is responsive to determining that the recipient node is other than the first node.

3. The method of claim 1, further comprising:
determining that an additional packet is a mode-switch packet from the second node, the mode-switch packet indicating a communication mode applied by the second node to the message content packet;
determining a reception sensitivity of the first node; and
determining a transmission output power of the second node;
wherein calculating the quantity of backoff time slots is further based on the reception sensitivity and the transmission power output.

4. The method of claim 3, wherein one or more of the reception sensitivity or the transmission output power are determined based on a history of transmissions between the first node and the second node.

5. The method of claim 3, further comprising:
calculating, based on a history of transmissions between the first node and the second node, multiple default backoff values, each of the multiple default backoff values being associated with a particular communication mode in a set of communication modes;
responsive to receiving the mode-switch packet, identifying a particular default backoff value associated with the communication mode indicated by the mode-switch packet; and
responsive to determining that the mode-switch packet is associated with a prior transmission from the first node to the second node, modifying the particular default backoff value based on (i) a size of the prior transmission and (ii) the communication mode indicated by the mode-switch packet, wherein calculating the quantity of backoff time slots comprises calculating the quantity of backoff time slots based on the modified backoff value.

6. The method of claim 1, wherein determining the additional message content packet includes one or more of:
receiving the additional message content packet from a third node, or
generating the additional message content packet by the first node.

7. The method of claim 1, further comprising:
updating a node status table to include a communication status associated with the second node, the updated communication status indicating the second node is unavailable to receive transmissions during the quantity of backoff time slots.

8. The method of claim 1, further comprising:
identifying, by the first node, a queued message packet having a destination for a third node, the queued message packet having a queue position subsequent to the additional message content packet; and
responsive to determining that the third node is available to receive transmissions during the quantity of backoff time slots, modifying the queue position of the queued message packet to be prior to the additional message content packet.

9. The method of claim 1, wherein modifying the node-specific transmission delay includes adjusting the quantity of backoff time slots to include a conflict-avoidance delay.

10. A computer network node configured for managing node transmissions in a computer network using a time-slotted channel hopping protocol ("TSCH network"), the computer network node including a processor that is configured to perform operations comprising:
receiving a message-initiation packet from an additional node in the computer network;
determining, based on the message-initiation packet, a quantity of backoff time slots during which the additional node transmits a message content packet associated with the message-initiation packet;
modifying a node-specific transmission delay associated with the additional node, the node-specific transmission delay indicating the additional node is unavailable to receive transmissions during the quantity of backoff time slots;
receiving an additional message content packet having a destination for the additional node; and
queuing, based on the node-specific transmission delay, the additional message content packet for transmission subsequent to the quantity of backoff time slots,
wherein determining the quantity of backoff time slots comprises:
determining that the message-initiation packet is a header packet from the additional node;
determining a size of the message content packet associated with the header packet determining a communication mode indicated by the header packet; and
calculating the quantity of backoff time slots based on the size of the message content packet and the communication mode.

11. The computer network node of claim 10, the processor further configured for:
determining, by the computer network node and based on the message-initiation packet, a recipient node for the message content packet associated with the message-initiation packet, the recipient node being a node other than the computer network node, wherein modifying the node-specific transmission delay associated with the additional node is responsive to determining that the recipient node is other than the computer network node.

12. The computer network node of claim 10, wherein determining the quantity of backoff time slots comprises:
   determining that an additional packet is a mode-switch packet from the additional node, the mode-switch packet indicating a communication mode used by the additional node;
   determining a reception sensitivity of the computer network node;
   determining a transmission output power of the additional node; and
   wherein calculating the quantity of backoff slots is further based on the reception sensitivity and the transmission power output.

13. The computer network node of claim 12, wherein one or more of the reception sensitivity or the transmission output power are determined based on a history of transmissions between the computer network node and the additional node.

14. The computer network node of claim 12, the processor further configured for:
   calculating, based on a history of transmissions between the computer network node and the additional node, multiple default backoff values, each of the multiple default backoff values being associated with a particular communication mode in a set of communication modes;
   responsive to receiving the mode-switch packet, identifying a particular default backoff value associated with the communication mode indicated by the mode-switch packet; and
   responsive to determining that the mode-switch packet is associated with a prior transmission from the computer network node to the additional node, modifying the particular default backoff value based on (i) a size of the prior transmission and (ii) the communication mode indicated by the mode-switch packet,
   wherein calculating the quantity of backoff time slots comprises calculating the quantity of backoff time slots based on the modified backoff value.

15. The computer network node of claim 10, wherein receiving the additional message content packet includes one or more of:
   receiving the additional message content packet from a further node in the computer network, or
   generating the additional message content packet by the computer network node.

16. The computer network node of claim 10, the processor further configured for: updating a node status table to include a communication status associated with the additional node, the updated communication status indicating the additional node is unavailable to receive transmissions during the quantity of backoff time slots.

17. The computer network node of claim 10, the processor further configured for:
   identifying, by the computer network node, a queued message packet having a destination for a further node in the computer network, the queued message packet having a queue position subsequent to the additional message content packet; and
   responsive to determining that the further node is available to receive transmissions during the quantity of backoff time slots, modifying the queue position of the queued message packet to be prior to the additional message content packet.

18. The computer network node of claim 10, wherein modifying the node-specific transmission delay includes adjusting the quantity of backoff time slots to include a conflict-avoidance delay.

* * * * *